(12) United States Patent
Chu et al.

(10) Patent No.: US 7,187,107 B2
(45) Date of Patent: Mar. 6, 2007

(54) CLOSED-LOOP FEEDBACK CONTROL POSITIONING STAGE

(75) Inventors: Yi-Ming Chu, Kaohsiung (TW); Wei-Han Wang, Taipei (TW); Chao-Chi Wu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 252 days.

(21) Appl. No.: 11/027,192

(22) Filed: Dec. 29, 2004

(65) Prior Publication Data

US 2006/0138904 A1 Jun. 29, 2006

(51) Int. Cl.
*H01L 41/08* (2006.01)
*H02N 2/00* (2006.01)
(52) U.S. Cl. ............... 310/328; 310/316.01; 310/317; 310/323.01; 310/323.17; 310/328
(58) Field of Classification Search .......... 310/323.01, 310/323.17, 328
See application file for complete search history.

(56) References Cited

U.S. PATENT DOCUMENTS 5,252,884 A * 10/1993 Dona ........................ 310/328
6,555,829 B1 * 4/2003 Spallas et al. ........... 250/492.2
6,888,289 B2 * 5/2005 Heilig et al. ............ 310/323.17
6,995,499 B2 * 2/2006 Hwang ...................... 310/328
7,047,794 B2 * 5/2006 Hajduk et al. .............. 73/54.37
2002/0149758 A1 * 10/2002 Poon .......................... 355/72

FOREIGN PATENT DOCUMENTS

JP 62-152380 A * 7/1987 ................. 310/311

\* cited by examiner

*Primary Examiner*—Thomas M. Dougherty
(74) *Attorney, Agent, or Firm*—W. Wayne Liauh (57) ABSTRACT

Provided is a closed-loop feedback control positioning stage comprising at least one block formed therein, a plurality of hinge mechanisms for attaching the block in the stage, at least one actuator formed in the block, the actuator adapted to bend for moving the block in at least one direction, and a plurality of strain gauges each attached in a corresponding hinge mechanism for measuring its strain. The invention can repeatedly position the block at the moved location for carrying out a highly precise positioning of the stage.

10 Claims, 13 Drawing Sheets

CLOSED-LOOP FEEDBACK CONTROL POSITIONING STAGE

BACKGROUND OF THE INVENTION

1. Field of Invention

The present invention relates to positioning mechanisms and more particularly to a highly precise closed-loop feedback control positioning stage.

2. Related Art

Conventionally, lead screws, gears, belts, bearings, and linear rails are employed in a mechanical feeding system. Such components are low in precision due to tolerance or low in positioning accuracy due to assembly error. Moreover, a stage is not stable due to friction between components. As such, above drawbacks must be substantially eliminated if it is desired to apply the mechanical feeding systems in nano based applications. Unfortunately, these drawbacks are still bottleneck yet to be solved. As a result, ultra-precise positioning systems are high in the manufacturing cost.

Conventionally, flexure structure is employed in positioning systems. In detail, stage is made flexible (i.e., flexure stage). A piezoelectric actuator is used as drive of the stage. A highly precise positioning of the stage is thus achieved by flexibly deforming the actuator. Flexure structure is thus used as a replacement of earlier revolute pair, prismatic pair, and spherical pair. By utilizing this, assembly error, component friction, stick loss, temperature abnormal rise, and low rigidity are substantially eliminated. Moreover, micromachining can be facilitated when a stage is made even smaller as time evolves.

Figure 1:
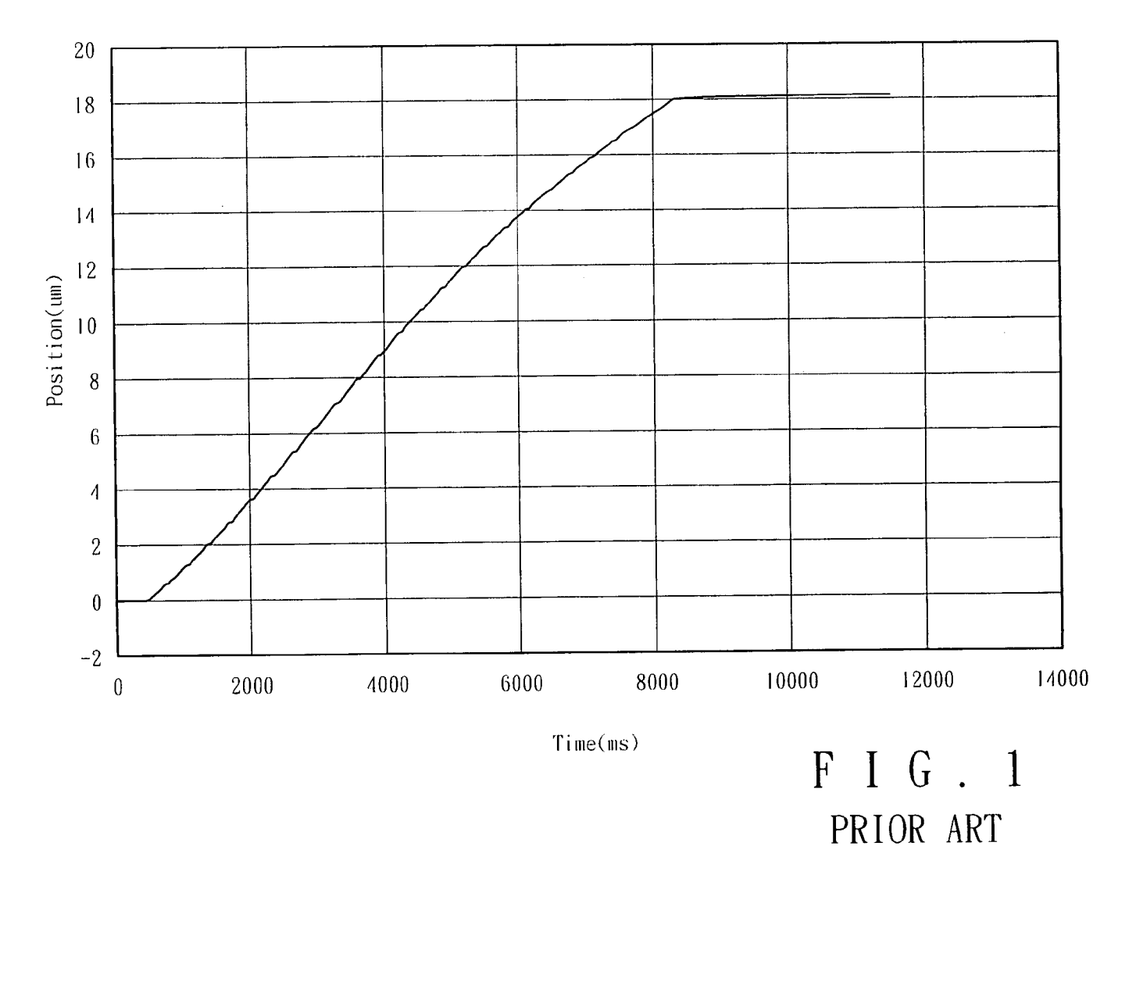
FIG. 1 plots position versus time for a curve of the prior piezoelectric stage.

Such piezoelectric stages are widely employed in nano based detections and nano based manufacturing processes. However, piezoelectric stages have drawbacks such as creep and hysteresis, resulting in a non-linear effect as shown in FIG. 1 where position versus time for a curve of such piezoelectric stage is plotted. The non-linear effect in turn adversely affects positioning of the piezoelectric stage. Typically, the non-linear effect can be eliminated by closed-loop feedback control. Flexure stage is advantageous for having no gap and no assembly error. But there is error caused by interference between two orthogonal axes on the same plane. Such error also is required to be eliminated by closed-loop feedback control.

Figure 2:
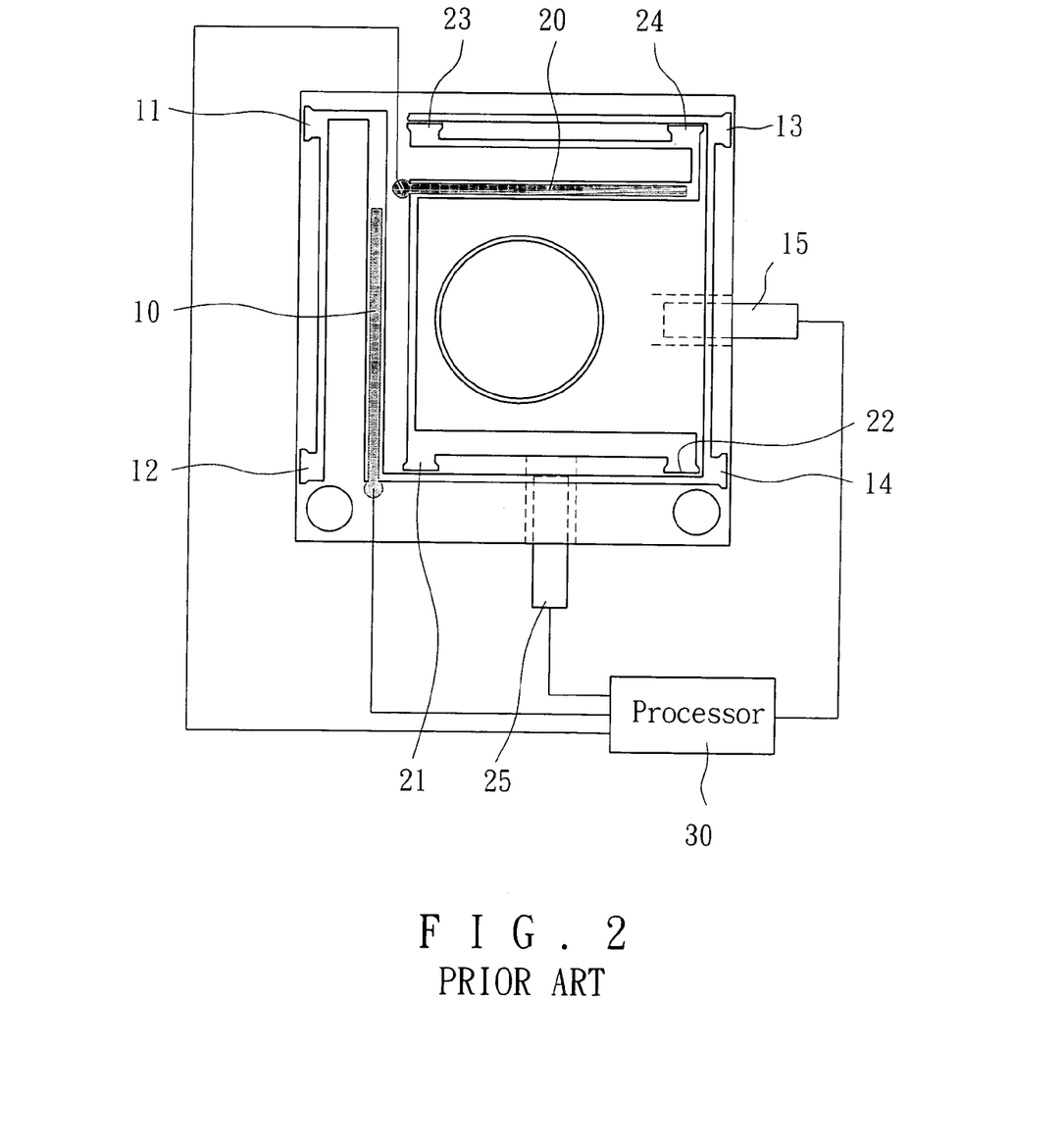
FIG. 2 is a schematic plan view of a closed-loop feedback control system used in a positioning stage of U.S. Pat. No. 6,555,829.

U.S. Pat. No. 6,555,829 discloses a high precision flexure stage having a closed-loop feedback control mechanism as shown in FIG. 2. Two bimorph piezoelectric actuators 10 and 20, four flexure bearings 11, 12, 13, and 14, and four flexure bearings 21, 22, 23, and 24 are defined in two channels respectively with the actuator 10 and 20 located therein. Transducers 15 and 25 monitor X and Y movement respectively of a stage in response to movements of actuators 10 and 20. The output signals of transducers 15 and 25 are monitored by a processor 30 which also controls the bending of actuators 10 and 20. The above components form a closed-loop feedback control system which enables processor 30 to precisely position an object mounted in the stage. The positioning precision of the transducer is proportional to that of the stage. Prior transducers are capacitive position sensors or laser interferometers. For the capacitive position sensors, distance between the sensor and an object to be tested is in the range of several micrometers to several hundred micrometers. In other words, precision requirement is very high. Also, advanced alignment equipment is required for correction. Further, its circuitry is complicated. For laser interferometer, it is bulky and is very high in price.

As a result, the prior closed-loop feedback control positioning stage is difficult of design and thus high in the manufacturing cost. Thus, it is desirable to provide a novel closed-loop feedback control positioning stage in order to overcome the above drawbacks of prior art.

SUMMARY OF THE INVENTION

It is therefore an object of the present invention to provide a positioning device controlled by a closed-loop feedback system, comprising a stage; at least one block formed in the stage; a plurality of hinge mechanisms for attaching the block in the stage; at least one actuator formed in the block, the actuator adapted to bend for moving the block in at least one direction; and a plurality of strain gauges each attached in a corresponding hinge mechanism for measuring its strain. By utilizing this, it is possible of repeatedly positioning the block at the moved location for carrying out a highly precise positioning of the stage.

The above and other objects, features and advantages of the present invention will become apparent from the following detailed description taken with the accompanying drawings.

DETAILED DESCRIPTION OF THE INVENTION

Figure 3:
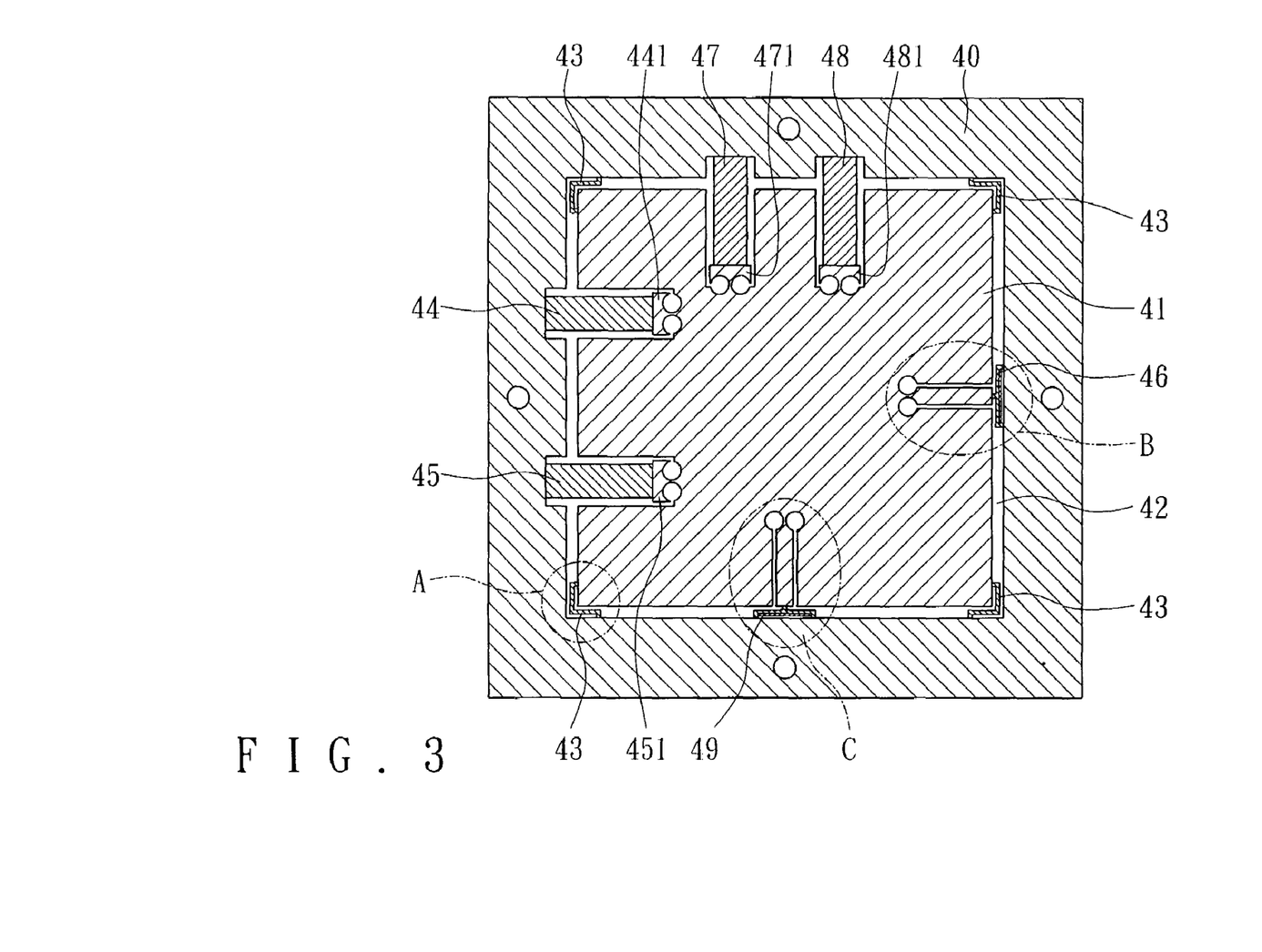
FIG. 3 is a schematic plan view of a positioning stage according to a first preferred embodiment of the invention.

Referring to FIG. 3, there is shown a first preferred embodiment of the invention. A parallelepiped block 41 is formed in a hollow portion of a stage 40. A peripheral channel 42 of the block 41 is formed by cutting or electrical discharge machining (EDM). Four corners of the block 41 are attached in the stage 40 by means of four hinge mechanisms (e.g., flexure hinge mechanisms, revolute pairs, prismatic pairs, or spherical pairs) 43. Two actuators 44 and 45 are provided between stage 40 and block 41 in a first direction (e.g., X direction) and each actuator is coupled to the block 41 by means of a flexure hinge 441 or 451. The actuators 44 and 45 are made of piezoelectric material and are implemented as linear motors or rotary motors. Also, a flexure hinge mechanism 46 is provided in an opposite position of the actuators 44 and 45 for interconnecting stage 40 and block 41. Similarly, two actuators 47 and 48 are provided between stage 40 and block 41 in a second direction (e.g., Y direction) and each actuator is coupled to the block 41 by means of a flexure hinge 471 or 481. The actuators 47 and 48 are made of piezoelectric material and are implemented as linear motors or rotary motors. Also, a flexure hinge mechanism 49 is provided in an opposite position of the actuators 47 and 48 for interconnecting stage 40 and block 41.

Figure 4:
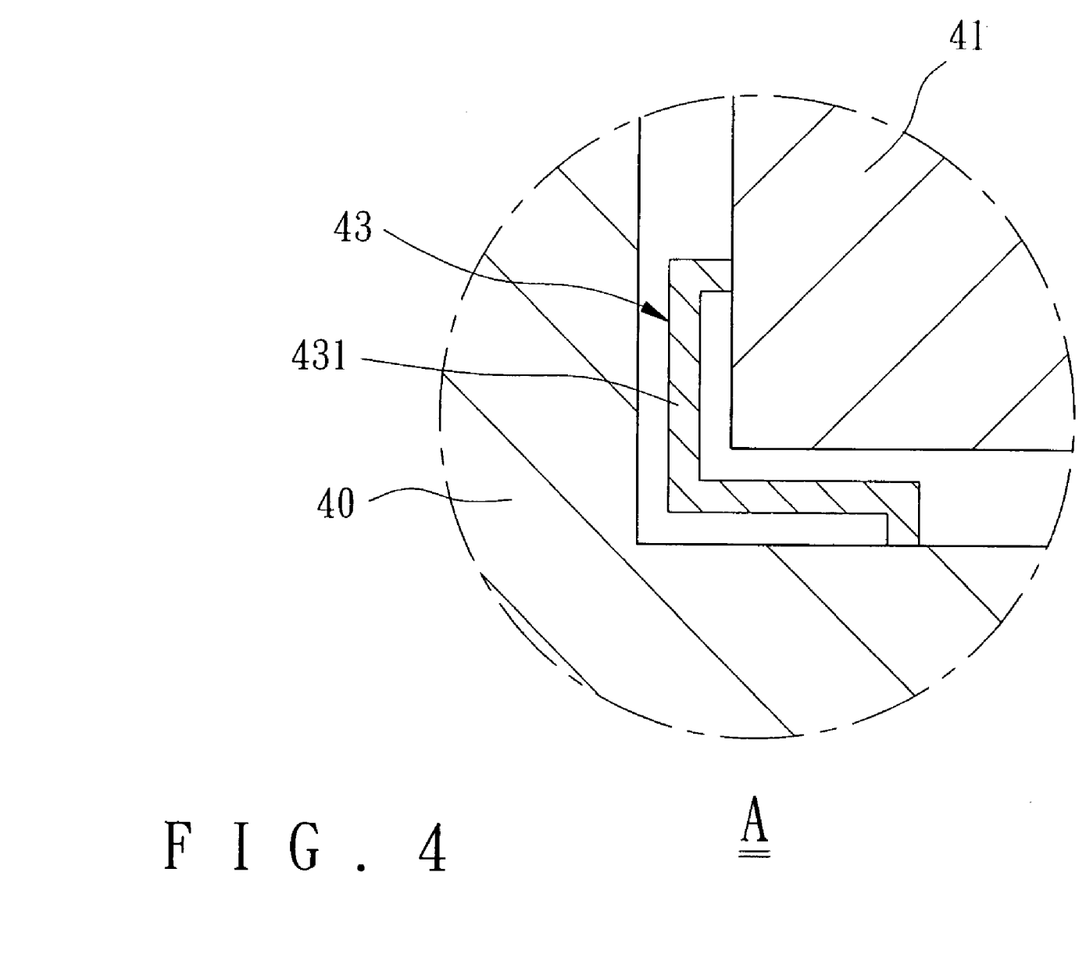
FIGS. 4, 5, and 6 are enlarged views of the areas in circles A, B, and C respectively in FIG. 3.
Figure 5:
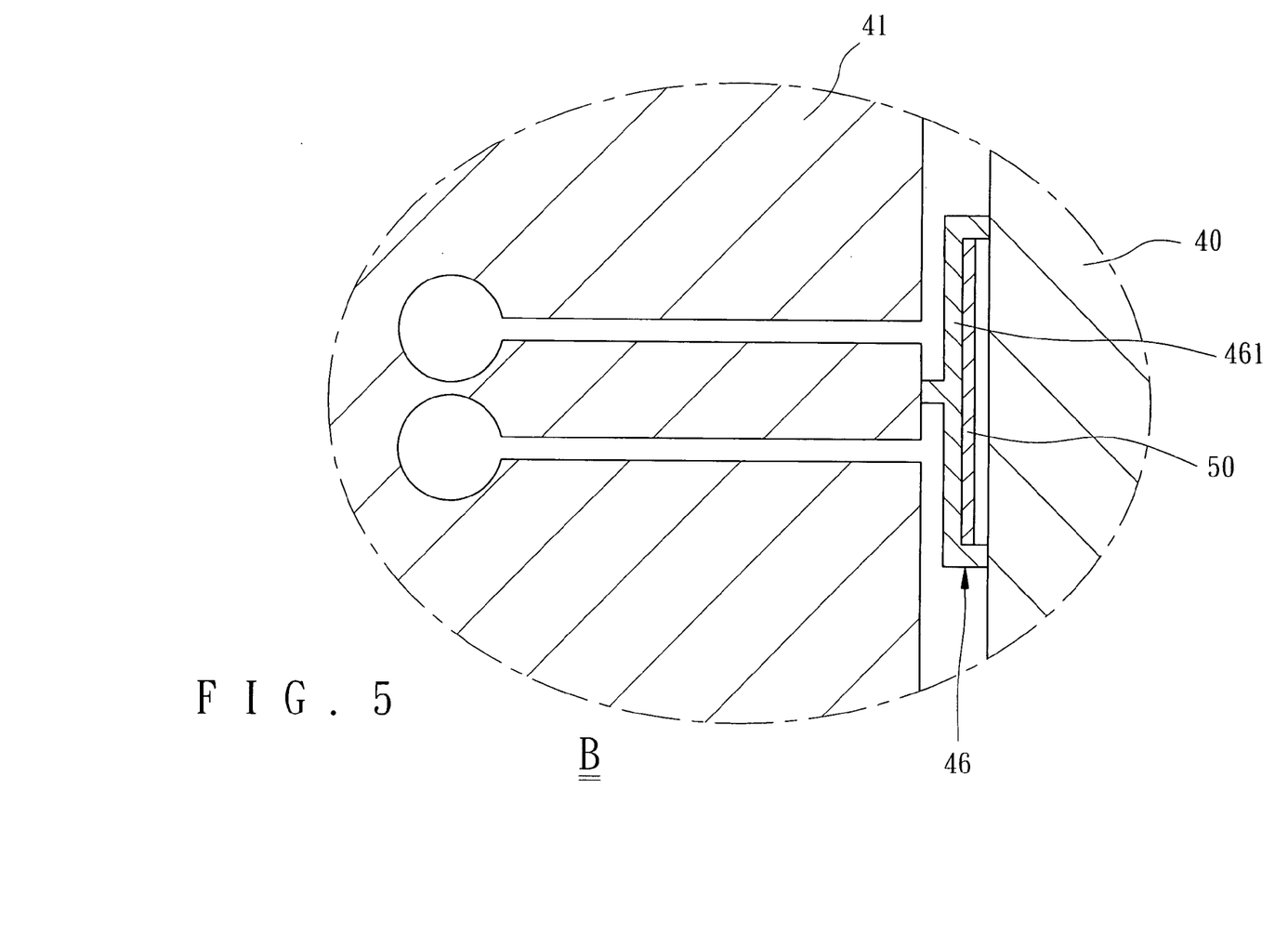

Referring to FIG. 4, the flexure hinge mechanism 43 at each corner of the block 41 is a slab spring 431 having a shape of two connected Ls. Referring to FIGS. 3 and 5, the flexure hinge mechanism 46 opposing actuators 44 and 45 is a slab spring 461 having another shape of two connected Ls. The actuators 44 and 45 bend (i.e., deflect) in the first direction to move the block 41 and also urge against the flexure hinge mechanism 46. The slab spring 461 is thus deformed by the flexure hinge mechanism 46. A strain gauge 50 (e.g., resistive strain gauge) is mounted at one side of the slab spring 461 for measuring its strain.

Figure 6:
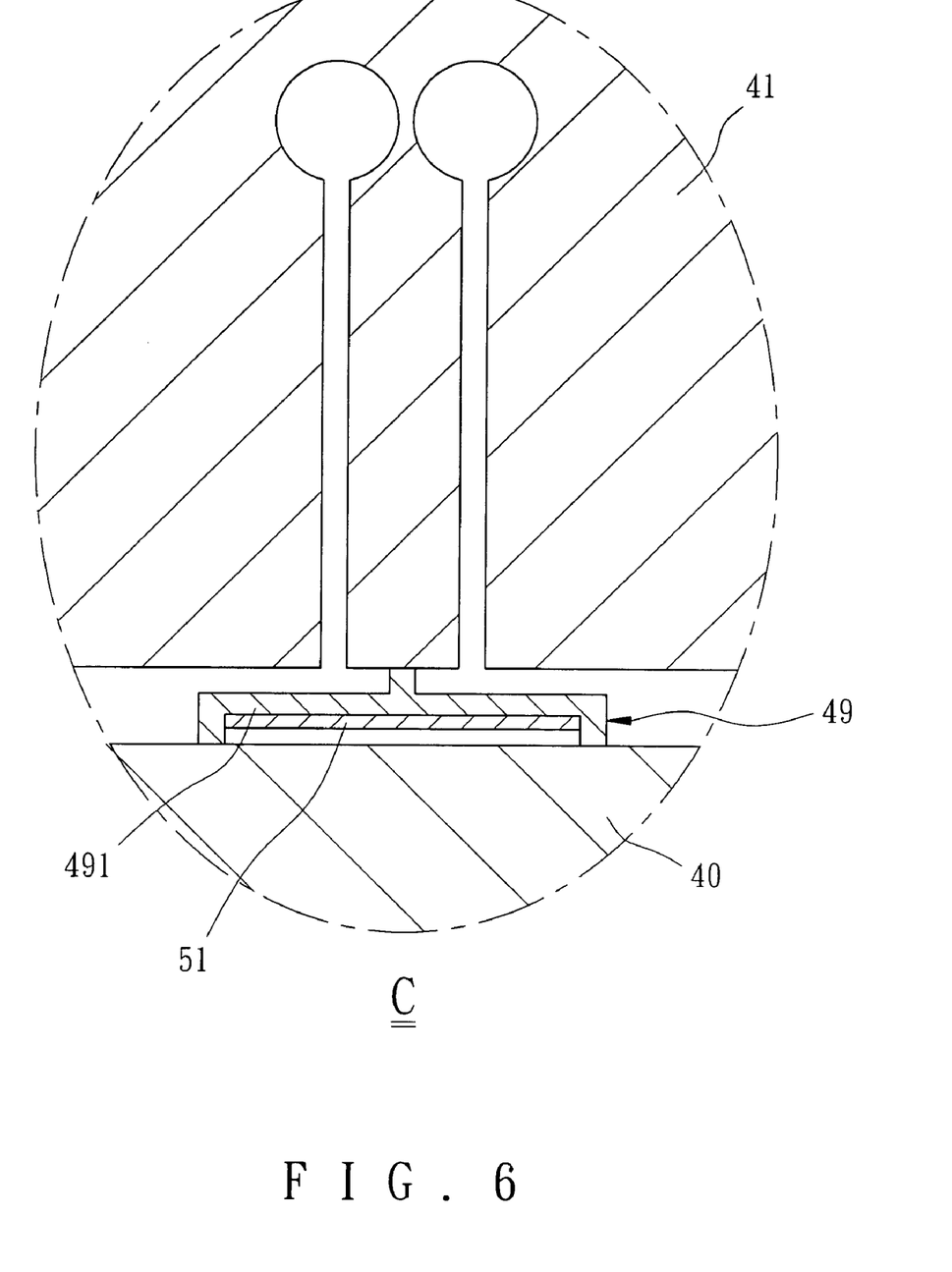

Referring to FIGS. 3 and 6, likewise, the flexure hinge mechanism 49 opposing actuators 47 and 48 is a slab spring 491 having another shape of two connected Ls. The block 41 bends (i.e., deflects) in the second direction to urge against the flexure hinge mechanism 49 in response to displacements of actuators 47 and 48. The slab spring 491 is thus deformed by the flexure hinge mechanism 49. A strain gauge 51 (e.g., resistive strain gauge) is mounted at one side of the slab spring 491 for measuring its strain.

The strain gauge is well known and is widely employed in test and measurement. The strain gauge is able to measure length change (i.e., elongation or compression) of most solid objects. In use, simply mount the strain gauge onto an object to be tested prior to measuring its strain by subjecting to a process. If strain occurs, the strain gauge will measure it and an electrical characteristic of the deformed object will be changed accordingly.

Figure 7:
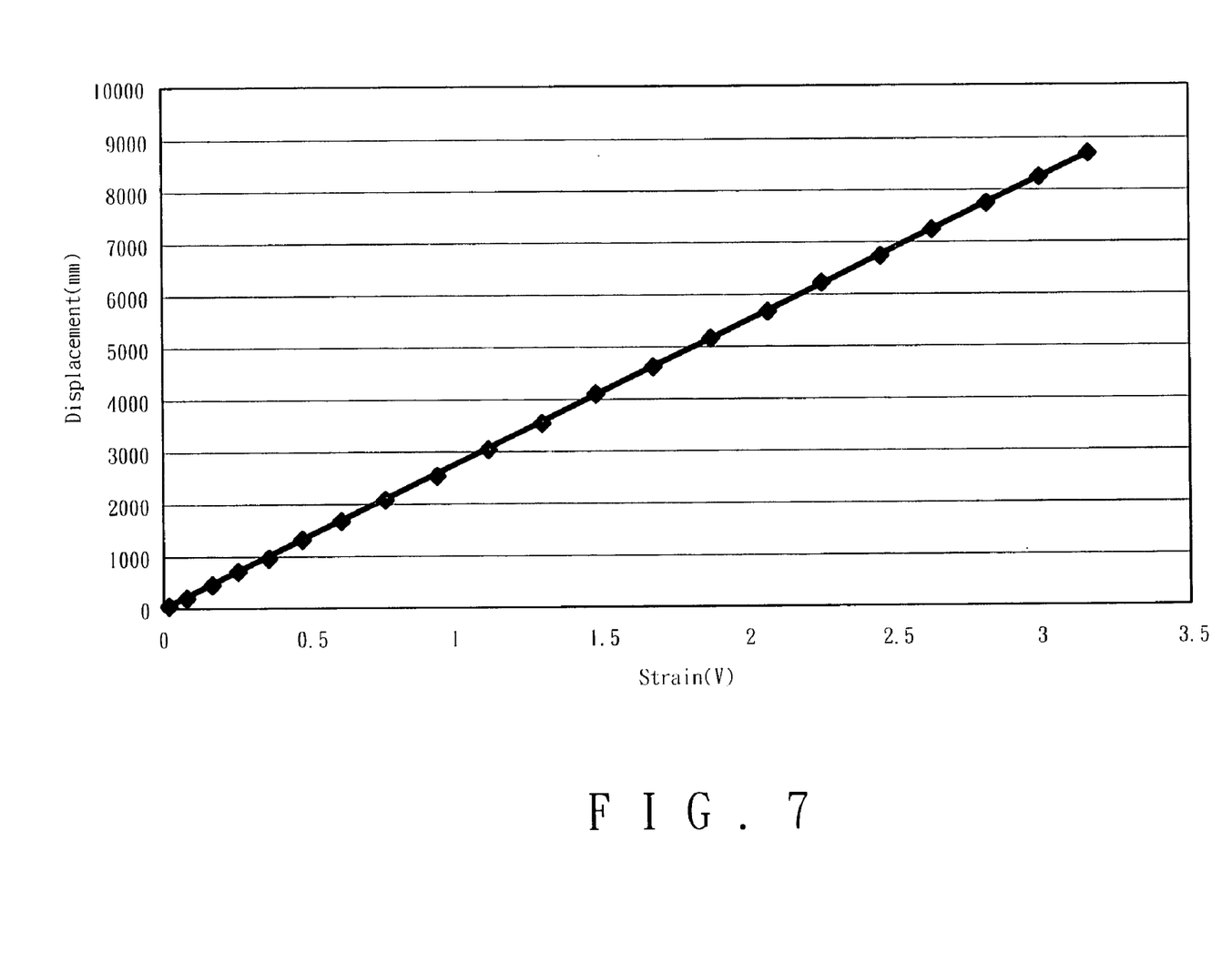
FIGS. 7 and 8 plot displacement versus strain for the stage of the invention moving in X and Y directions respectively.

Referring to FIG. 7, it plots displacement versus strain for the stage moving in X direction measured by the strain gauge mounted at one side of slab spring. A result of the measurement is represented by a substantially straight line.

Figure 8:
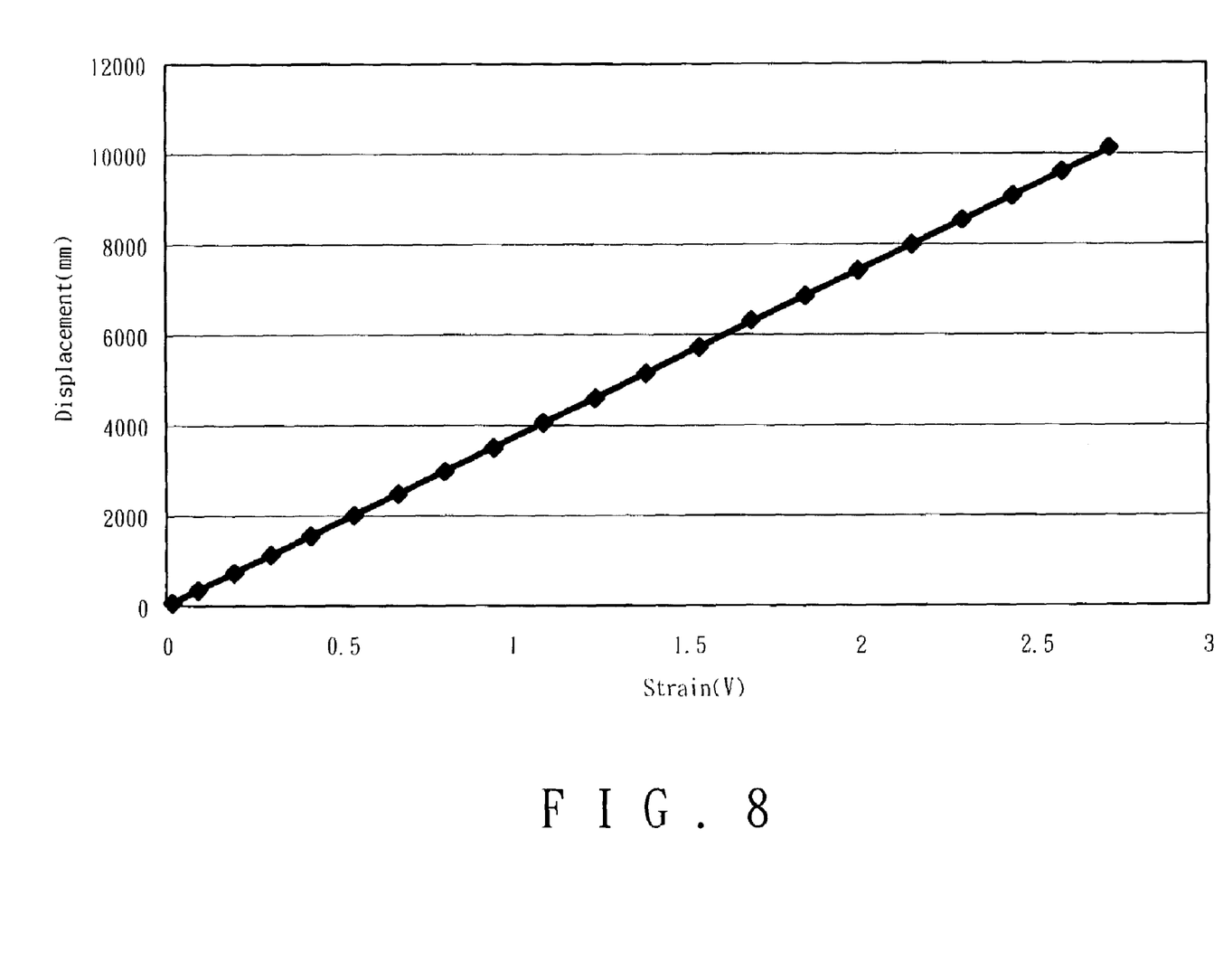

Referring to FIG. 8, likewise it plots displacement versus strain for the stage moving in Y direction measured by the strain gauge mounted at one side of slab spring. A result of the measurement is represented by a substantially straight line.

Figure 9:
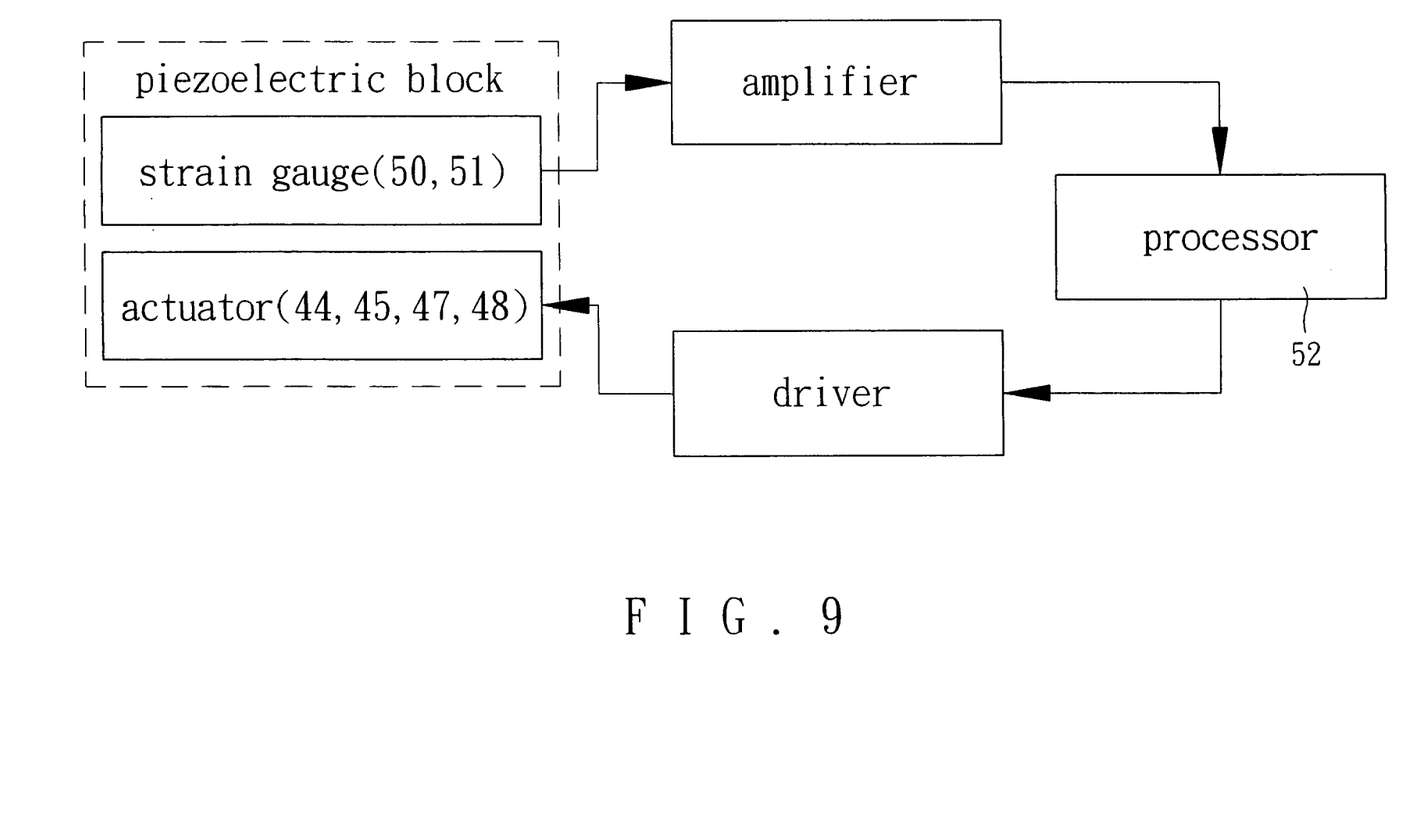
FIG. 9 is a block diagram of a closed-loop feedback control system used in the positioning stage of the invention.

Referring to FIGS. 5, 6, and 9, output signal of each of strain gauges 50 and 51 is fed to an amplifier (e.g., Wheatstone bridge) for amplification. The amplified signal is in turn sent to a processor 52. The processor 52 can process the amplified signal for enabling a driver to correct bending of each of actuators 44, 45, 47 and 48 in the end of a closed loop. As an end, a precise positioning of the stage can be achieved. Prior to an initial step of the correction, a highly precise laser interferometer is employed to compare output signal of each strain gauge with a normal one. A comparison result is utilized by the processor for obtaining a conversion algorithm. Next, in a process of measuring displacement of stage, there is no need of employing the expensive laser interferometer as means for detecting displacement. Instead, output signals of strain gauges are processed to calculate a displacement of the stage. Such not only can maintain stage but also can effect a closed-loop feedback control positioning stage.

Figure 10:
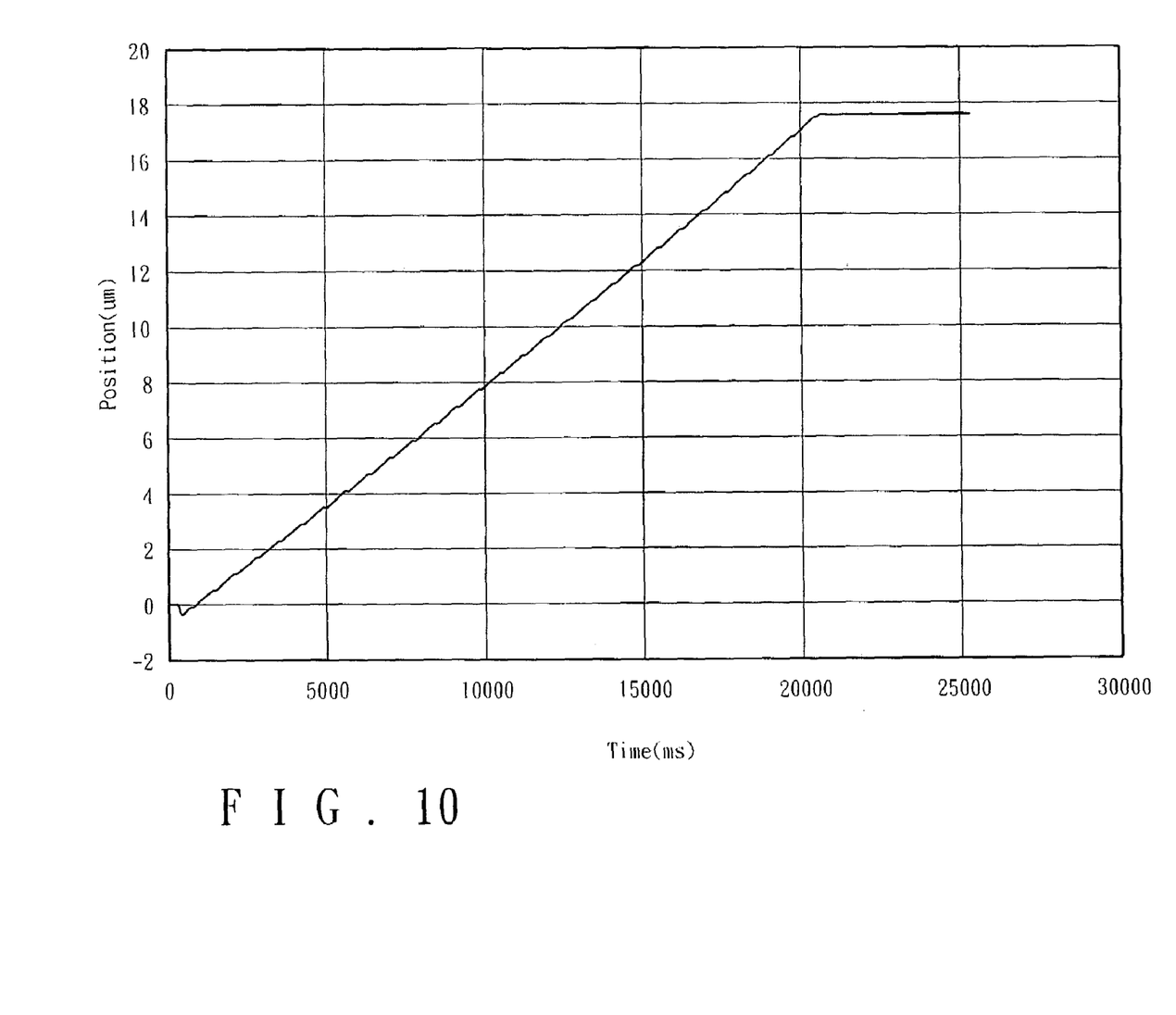
FIG. 10 plots position versus time for the stage of the invention after being corrected by the closed-loop feedback control system of the invention.

Referring to FIG. 10, it plots position versus time for the stage of the invention after being corrected by performing the above steps. That is, output signals of strain gauges are taken as signals for the closed-loop feedback control positioning of the invention. The processor processes output signals of strain gauges for enabling driver to correct bending of each actuator in the end of a closed loop. As such, block can move linearly. Also, processor can repeatedly position the block at the moved location. As an end, a precise positioning of the stage can be achieved.

Figure 11:
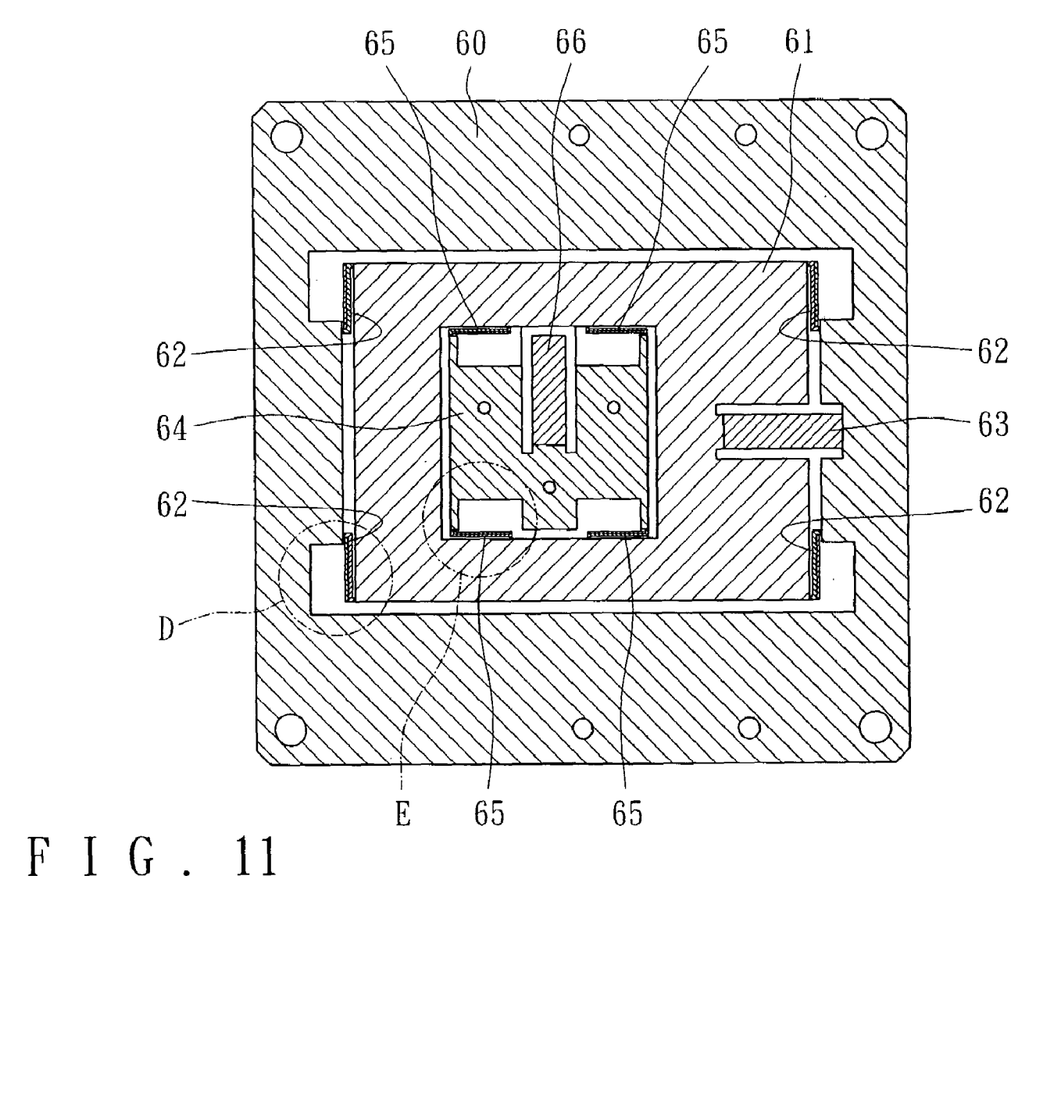
FIG. 11 is a schematic plan view of a positioning stage according to a second preferred embodiment of the invention.

Referring to FIG. 11, it shows a schematic plan view of a positioning stage according to a second preferred embodiment of the invention. A parallelepiped primary block 61 for decreasing interference between two orthogonal axes is formed in a hollow portion of a stage 60. Four corners of the block 61 are attached in the stage 60 by means of four hinge mechanisms 62. At least one of the hinge mechanisms 62 is a flexure hinge mechanism and the remaining ones thereof can be revolute pairs, prismatic pairs, or spherical pairs. A side actuator 63 is provided between stage 60 and primary block 61 in a first direction (e.g., X direction). A secondary block 64 is formed in the primary block 61. Four corners of the secondary block 64 are attached in the primary block 61 by means of four hinge mechanisms 65. At least one of the hinge mechanisms 65 is a flexure hinge mechanism and the remaining ones thereof can be revolute pairs, prismatic pairs, or spherical pairs. An actuator 66 is provided between the secondary block 64 and the primary block 61 in a second direction (e.g., Y direction).

Figure 12:
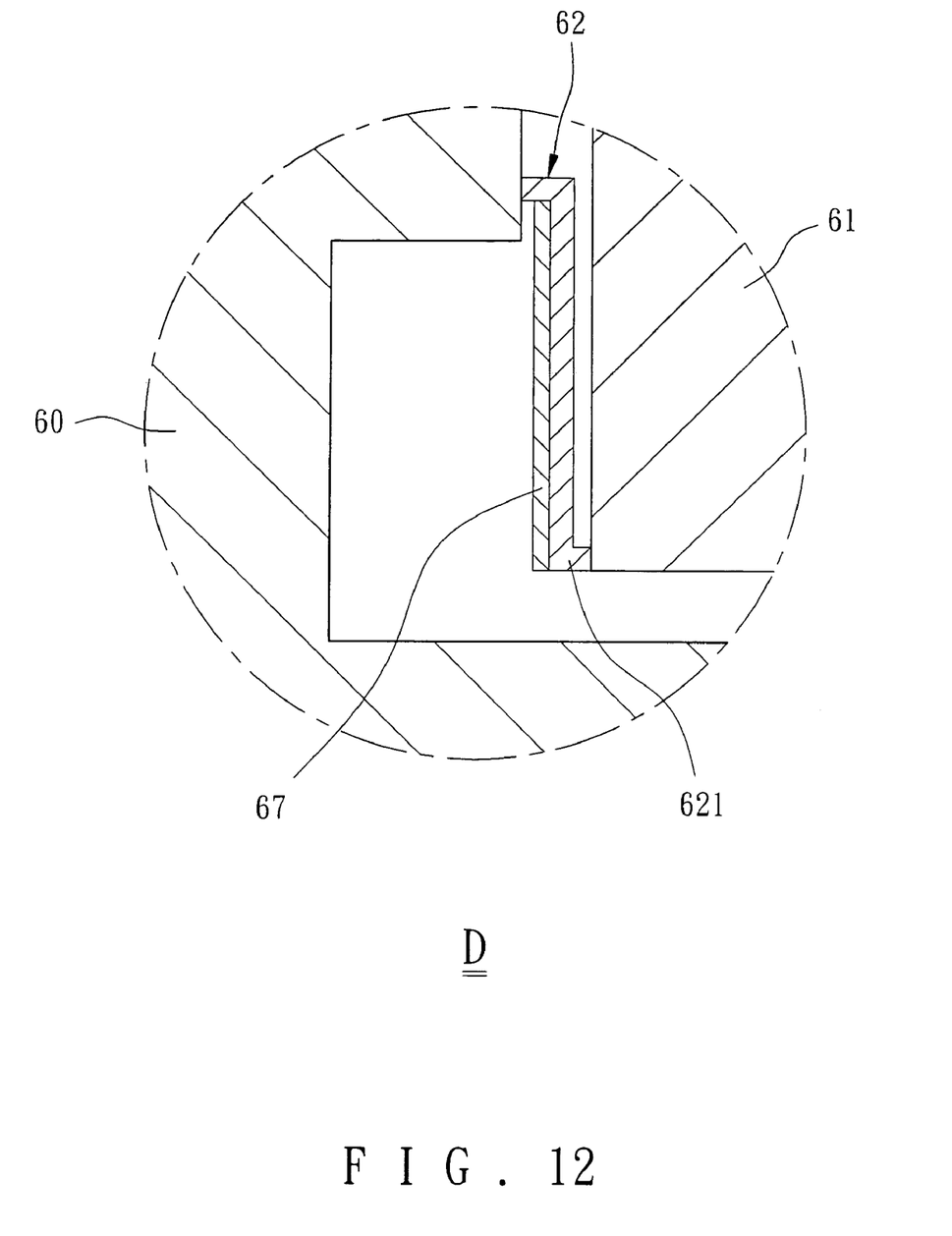
FIGS. 12 and 13 are enlarged views of the areas in circles D and E respectively in FIG. 11.
Figure 13:
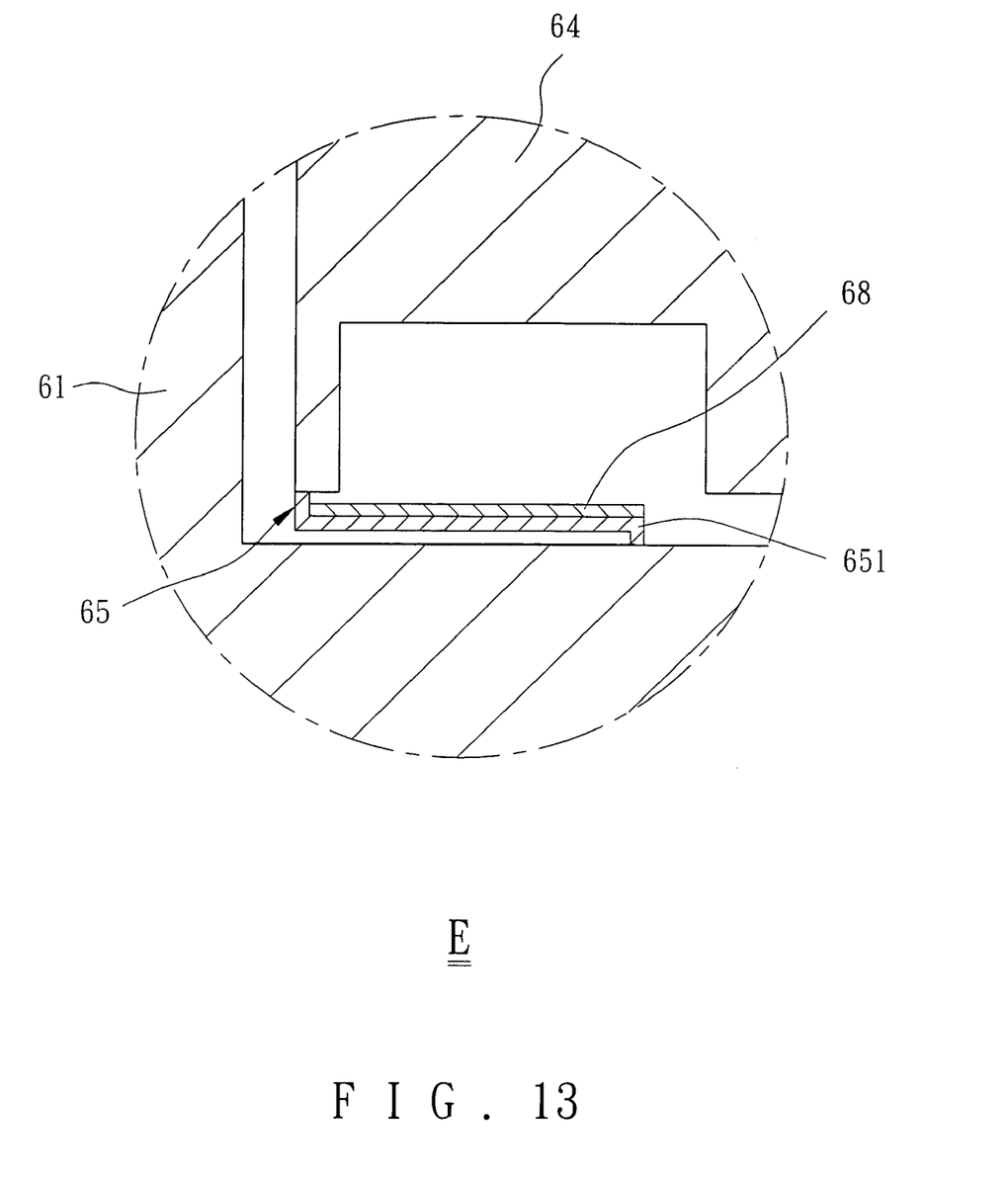

Referring to FIG. 12, the flexure hinge mechanism 62 at each corner of the primary block 61 is a slab spring 621 having a shape of substantially Z. A strain gauge 67 (e.g., resistive strain gauge) is mounted at one side of the slab spring 621 for measuring its strain. Referring to FIG. 13, likewise the flexure hinge mechanism 65 at each corner of the secondary block 64 is a slab spring 651 having a shape of substantially Z. A strain gauge 68 (e.g., resistive strain gauge) is mounted at one side of the slab spring 651 for measuring its strain.

Referring to FIGS. 11, 12, and 13 again, in response to bending of actuator 63 in the first direction the primary block 61 moves and thus the secondary block 64 moves both in the first direction. Also, the flexure hinge mechanism 62 is urged for deforming the slab spring 621. Output signal of the strain gauge 67 is fed to an amplifier for amplification. The amplified signal is in turn sent to processor 52. The processor 52 can process the amplified signal for enabling driver to correct bending of the actuator 63 in the end of a closed loop. As a result, a precise positioning of the primary block 61 in the first direction can be achieved.

Likewise, in response to bending of actuator 66 in the second direction the secondary block 64 moves in the second direction. Also, the flexure hinge mechanism 65 is urged for deforming the slab spring 651. Output signal of the strain gauge 68 is fed to an amplifier for amplification. The amplified signal is in turn sent to processor 52. The processor 52 can process the amplified signal for enabling driver to correct bending of the actuator 66 in the end of a closed loop. As a result, a precise positioning of the secondary block 64 in the second direction can be achieved. By utilizing this, interference between two orthogonal axes can be decreased interference between two orthogonal axes. While two blocks are employed in the second preferred embodiment of the invention (i.e., having a center in common), it is possible that three or more blocks (i.e., also having a center in common) can be employed in some embodiments with the goal of carrying out a closed-loop feedback control positioning stage without being compromised.

While the invention herein disclosed has been described by means of specific embodiments, numerous modifications and variations could be made thereto by those skilled in the art without departing from the scope and spirit of the invention set forth in the claims.

What is claimed is:

1. Positioning device controlled by a closed-loop feedback system, comprising:
    a stage;
    at least one block formed in the stage;
    a plurality of hinge mechanisms for attaching the block in the stage;
    at least one actuator formed in the block, the actuator adapted to bend for moving the block in at least one direction; and
    a plurality of strain gauges each attached in a corresponding hinge mechanism for measuring its strain.

2. The positioning device of claim 1, further comprising an amplifier for receiving an output signal of each strain gauge for amplification, a processor for receiving the amplified signal and processing the same, and a driver enabled by the processor so as to correct the bending of each actuator.

3. The positioning device of claim 1, wherein each block is adapted to move in two or more directions.

4. The positioning device of claim 1, wherein two or more blocks are formed to have a center in common and each thereof is adapted to move in at least one direction.

5. The positioning device of claim 1, wherein at least one of the hinge mechanisms is a flexure hinge mechanism and each of the remaining ones thereof is a revolute pair, a prismatic pair, or a spherical pair.

6. The positioning device of claim 5, wherein the flexure hinge mechanism is a slab spring.

7. The positioning device of claim 1, wherein each actuator is made of piezoelectric material and is implemented as a linear motor or a rotary motor.

8. The positioning device of claim 7, wherein each actuator made of piezoelectric material is attached to the block by the hinge mechanism.

9. The positioning device of claim 1, wherein each actuator is adapted to bend in at least one direction for moving the block toward the same.

10. The positioning device of claim 1, wherein each strain gauge is located at the flexure mechanism opposing the actuator.

* * * * *